United States Patent
Cai et al.

(10) Patent No.: US 7,587,092 B2
(45) Date of Patent: Sep. 8, 2009

(54) LAYER-BASED CONTEXT QUANTIZATION WITH CONTEXT PARTITIONING

(75) Inventors: Hua Cai, Kowloon (HK); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 11/287,054

(22) Filed: Nov. 25, 2005

(65) Prior Publication Data
US 2007/0122046 A1 May 31, 2007

(51) Int. Cl.
G06K 9/36 (2006.01)
G06K 9/46 (2006.01)

(52) U.S. Cl. ........................ 382/239; 382/238

(58) Field of Classification Search .............. 382/238, 382/239
See application file for complete search history.

(56) References Cited

U.S. PATENT DOCUMENTS

| | | | | |
|---|---|---|---|---|
| 5,835,034 | A * | 11/1998 | Seroussi et al. | 341/65 |
| 6,084,987 | A * | 7/2000 | Allen | 382/239 |
| 6,282,321 | B1 * | 8/2001 | Kim | 382/239 |
| 6,785,425 | B1 * | 8/2004 | Feder et al. | 382/247 |
| 6,856,700 | B1 * | 2/2005 | Wang | 382/239 |
| 6,865,298 | B2 * | 3/2005 | Li | 382/238 |
| 7,062,101 | B2 * | 6/2006 | Schwartz | 382/248 |
| 2003/0138151 | A1 * | 7/2003 | Schwartz | 382/239 |
| 2005/0123207 | A1 * | 6/2005 | Marpe et al. | 382/239 |

OTHER PUBLICATIONS

Forchhammer et al. "Optimal context quantization in lossless compression of image data sequences", IEEE Transactions on Image Processing, Apr. 2004, vol. 14, No. 4, 509-517.*
Muresan et al. "Quantization as histogram segmentation: globally optimal scalar quantizer design in network systems". Data Compression Conference (DCC '02), Snowbird, UT, Apr. 2-4, 2002.*
Chen; Jianhua, "Context modeling based on context quantization with application in wavelet image coding", IEEE Transactions on Image Processing, 2004, vol. 13, 26-32.*
Wu; Xiaolin, "Lossless compression of continuous-tone images via context selection, quantization, and modeling", IEEE Transactions on Image Processing, 1997, vol. 6, 656-664.*

* cited by examiner

Primary Examiner—Samir A. Ahmed
Assistant Examiner—Li Liu
(74) Attorney, Agent, or Firm—Lee & Hayes, PLLC

(57) ABSTRACT

Conditioning states are selected for coding a source from a plurality of potential conditioning states. The potential conditioning states represent a series of context events, such as a plurality of binary context events. According to a rule, potential conditioning states are partitioned into groups, such as by partitioning the potential conditioning states according to the number or significant context events in each of the conditioning states. The conditioning states within each of the groups are then collected into layers, and then the conditioning states in the layer are quantized to form a next layer of collective conditioning states. Coding efficiency indicators, such as context quantization efficiencies, are calculated for each of the layers. Based on the context quantization efficiencies, layers in each of the groups are selected for use in a context model for coding the source.

16 Claims, 11 Drawing Sheets

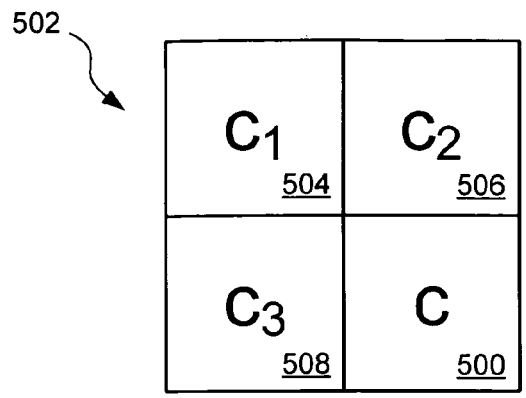
*FIGURE 5*
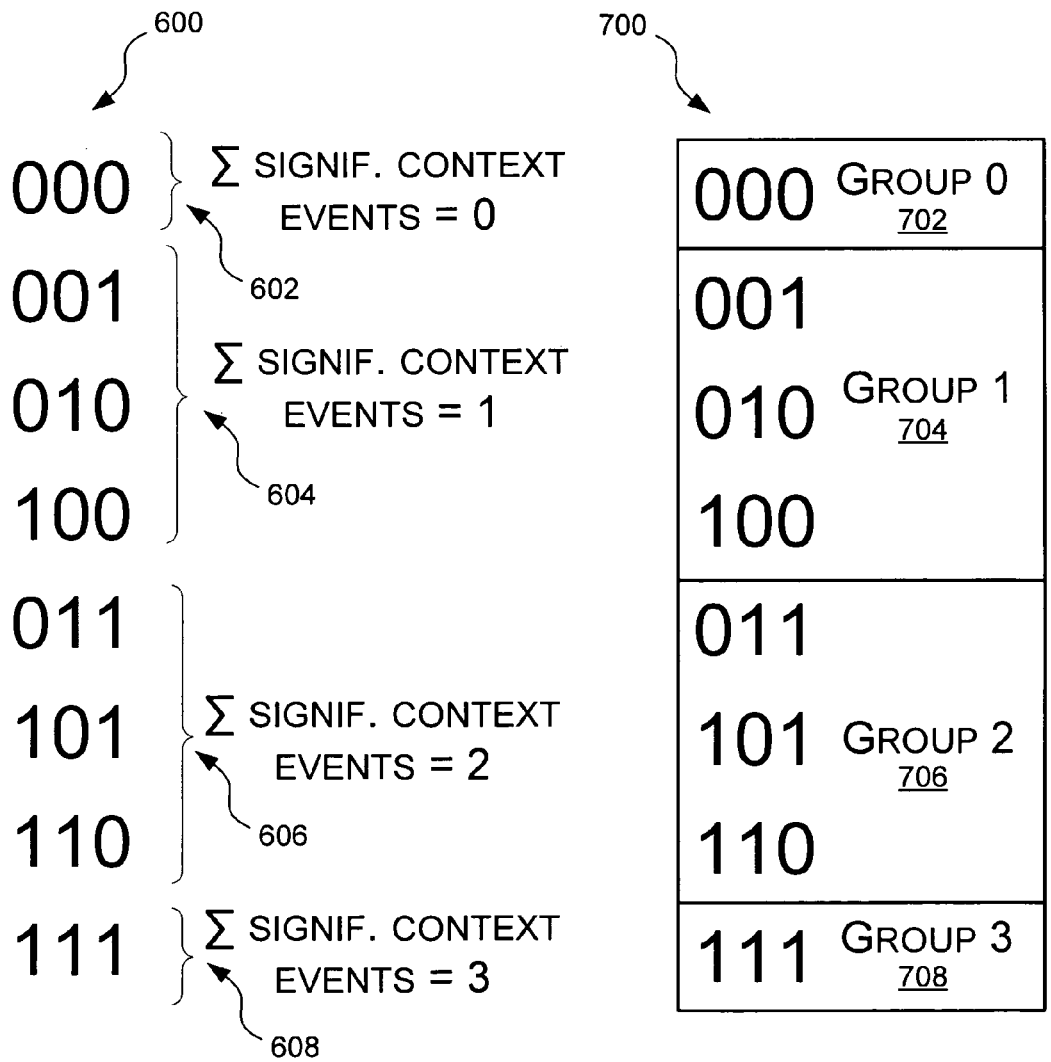
*FIGURE 6*  *FIGURE 7*

LAYER-BASED CONTEXT QUANTIZATION WITH CONTEXT PARTITIONING

BACKGROUND

Improving digital imaging technology allows for increasingly higher resolution and color variation in digital images. As image quality increases, however, resulting image data files increase geometrically in size. Image compression technologies strive to reduce the storage required to store image data and the bandwidth needed to transmit image data.

Image compression technologies seek to balance competing interests. On one hand, it is desirable to compress the size of a data file as much as possible so that the compressed file will consume the least amount of storage or bandwidth. On the other hand, the more a data file is compressed, the more computing resources and time are consumed in compressing the file.

FIG. 1 shows a functional block diagram of a representative encoder 100 and decoder 140 pair used to compress and decompress source data 102, respectively. For sake of example, the source data 102 includes image or video data. The encoder 100 receives the source data 102. In one embodiment, the encoder 100 first presents the source data 102 to a preprocessor 104. The preprocessor 104 separates the source data 102 into luminosity (grayscale) and chrominosity (color) components.

The output of the preprocessor 104 is presented to a transformer 106 that performs frequency transformation on the output of preprocessor 104. The transformer 106 may perform discrete wavelet transformation (DWT), discrete cosine transformation (DCT), fast Fourier transformation (FFT), or another similar frequency domain transformation on the preprocessed data. Individual data values vary less from neighboring values in transformed, frequency domain data, as compared to the spatial domain data.

Taking advantage of the less variant data values in the frequency domain data, the quantizer 108 identifies and aggregates data values having identical values, replacing a repeating series of identical data values with one instance of the data value combined with an indication of how many times the identical data value repeats. Similarly, the quantizer may combine a series of similar but not identical values with a single identical value when data values representing them with data points of equal value when the data values fall within a particular tolerance. Aggregating similar but not identical data values is used in lossy compression where some degradation of the original image is acceptable.

The output of the quantizer 108 is presented to an entropy coder 110 that generates the compressed image data 120. Generally, entropy coding compresses data by identifying or predicting the frequency with which data values occur in a data file. Then, instead of representing each data value with a fixed, equal-length value, entropy coding represents more frequently appearing data values with shorter binary representations. By replacing frequently appearing data values with shorter representations instead of fixed, equal-length representations, the resulting compressed data 120 is reduced in size.

The compressed data 120 generated by the entropy coder 110 is presented to a channel 130. The channel 130 may include data storage and/or data transmission media. A decoder 140 receives or retrieves the compressed data 120 from the channel 130 and decompresses the compressed data 120 through a mirror image of the process applied by the encoder 100. The compressed data 120 is translated by an entropy decoder 142, a dequantizer 144, an inverse transformer 146, and a postprocessor 148 that ultimately presents output data 150, such as image or video data suitable for presentation on a display or other device.

The entropy coder 110 uses a probabilistic context model to determine which values are assigned shorter and longer codes by predicting or determining which data values to appear more and less frequently, respectively. The context model includes a plurality of conditioning states used to code the data values. The context model used by the entropy encoder 110 may be a static model, developed off-line and stored both with the encoder 100 and the decoder 140. However, because the frequency with which data values may vary substantially between different data files, using a universal context model may not result in effective compression for every data file. Alternatively, a context model may be developed for each data file. The context model used by the entropy coder is stored and transmitted as part of the compressed data 120, so that the context model is available to the entropy decoder 142 to decode the compressed data 120.

Compression may be increased by using a higher order context model. A high order context model includes a large number of conditioning states for coding the data values, thus allowing for the possibility of higher coding efficiency in coding data values with the fewer bits. However, a higher order context model not only includes a large number of predicted values, but the conditioning states themselves are of a higher order. Thus, the higher the order of the context model, the more storage or bandwidth the context model consumes.

Further, if the order of the model is too high, a higher order context model may actually reduce coding efficiency. If too high an order context model is used, the coded data values may not converge sufficiently to meaningfully differentiate between data values occurring more and less frequently in the input data. This problem commonly is known as "context dilution" or "model cost," and reduces efficiency of the entropy coder.

One solution to address the content dilution problem is context quantization. Context quantization encodes values based on a selected subset of conditioning states representing data values from an area adjacent the data value being coded. Because of the complexity of finding good conditioning states and the significant overhead of representing the found conditioning states presented by the quantizer, conventional context quantizers are trained offline from a training set of data values. However, as previously described, the frequency with which data values appear in different sets of data will vary. Thus, quantizing a context model on training sets may not consistently provide effective compression.

SUMMARY

Conditioning states are selected for coding a source from a plurality of potential conditioning states. The potential conditioning states represent a series of context events, such as a plurality of binary context events. According to a rule, potential conditioning states are partitioned into groups, such as by partitioning the potential conditioning states according to the number of significant context events in each of the conditioning states. The conditioning states within each of the groups are then collected into layers, and then the conditioning states in the layer are quantized to form a next layer of collective conditioning states. Coding efficiency indicators, such as context quantization efficiencies, are calculated for each of the layers. Based on the context quantization efficiencies, layers in each of the groups are selected for use in a context model for coding the source.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a three-digit reference number and the two left-most digits of a four-digit reference number identify the figure in which the reference number first appears. The use of the same reference numbers in different figures indicates similar or identical items.

FIG. 5 is a block diagram of three binary context events selected for encoding a data value c.

FIG. 6 is a listing of the possible conditioning states based on the three-event context of FIG. 5.

FIG. 7 is a listing of groups of the conditioning states of FIG. 6 according to a mode of partitioning of context partitioning.

DETAILED DESCRIPTION

Use of a Context Quantizer to Reduce the Number Conditioning States

Figure 1:
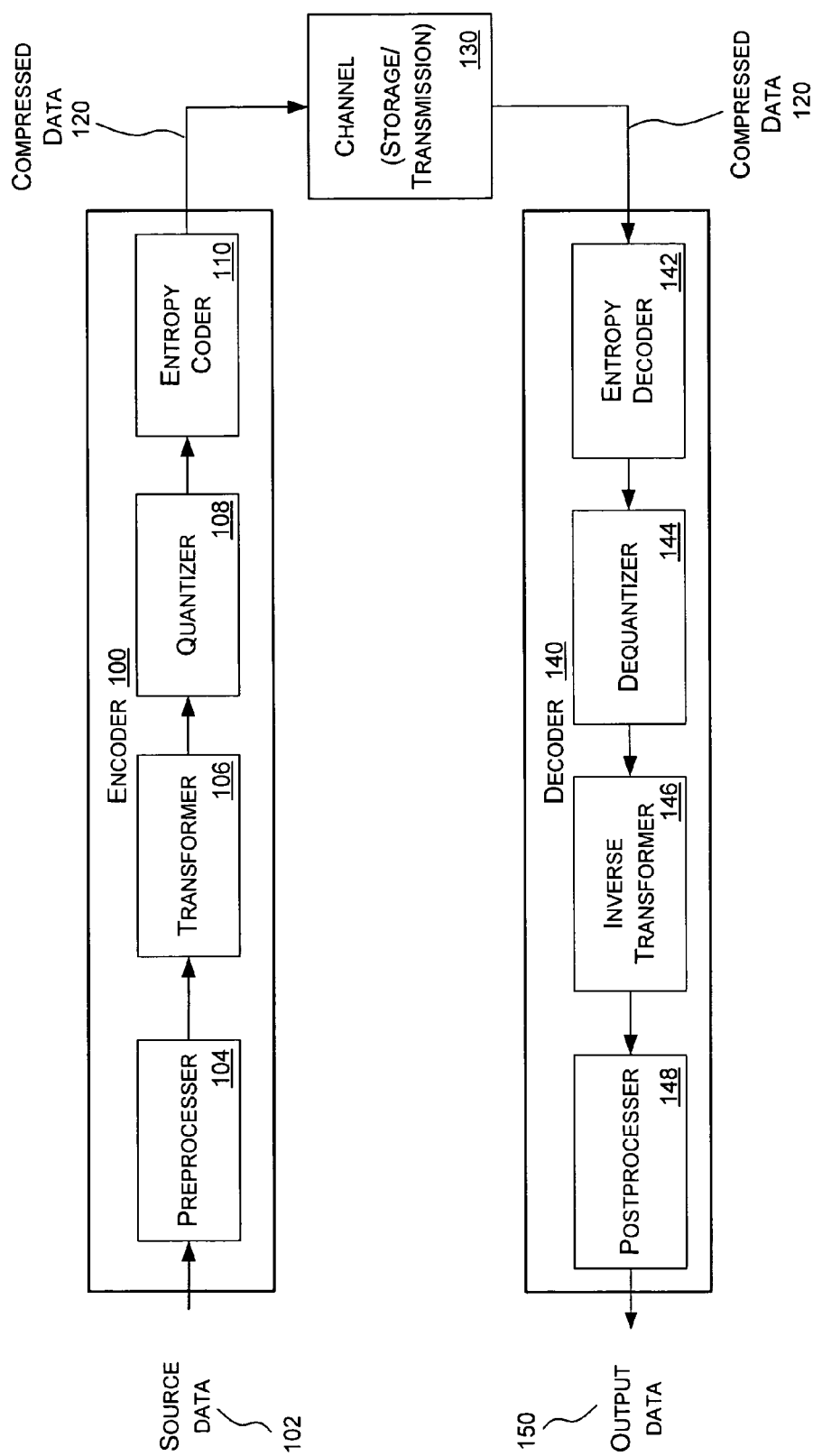
FIG. 1 (Prior Art) is a block diagram of a typical encoder and decoder pair used in image compression and decompression, respectively.
Figure 2:
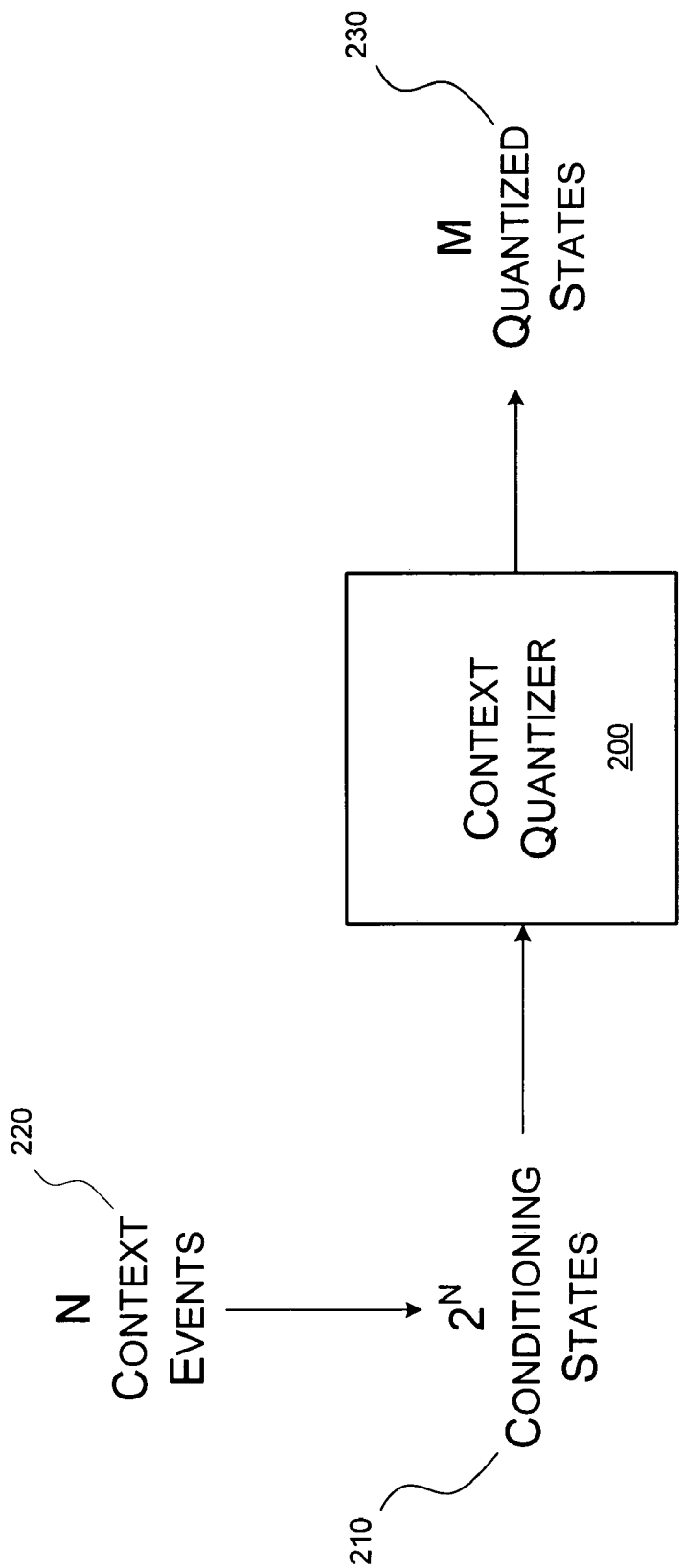
FIG. 2 is a block diagram of a context quantizer for reducing a number of conditioning states used in performing entropy coding.

FIG. 2 is a block diagram illustrating an embodiment of a mode of a context quantizer 200. The context quantizer 200 is used to reduce the number of conditioning states to develop a probabilistic model that achieves desired coding efficiency without an unnecessarily high order model.

In one exemplary mode described in detail herein, the context quantizer 200 reduces $2^N$ conditioning states 210, which are derived from N binary context events 220. Thus, for example, if two context events are selected, N is equal to 2, and $2^N$ becomes $2^2$ yielding a total of four conditioning states: 00, 01, 10, and 11.

An object of the context quantizer 200 is to reduce the $2^N$ conditioning states 210 to M quantized states 230, where $M < 2^N$. By reducing the number of conditioning states, the size of the resulting probabilistic model and the possibility of context dilution both are reduced. In a mode of a context quantization process described below, quantizing the $2^N$ conditioning states 210 states to M quantized states 230 provides a desired level of coding efficiency while avoiding the problems associated with an unnecessarily high order model.

Figure 3:
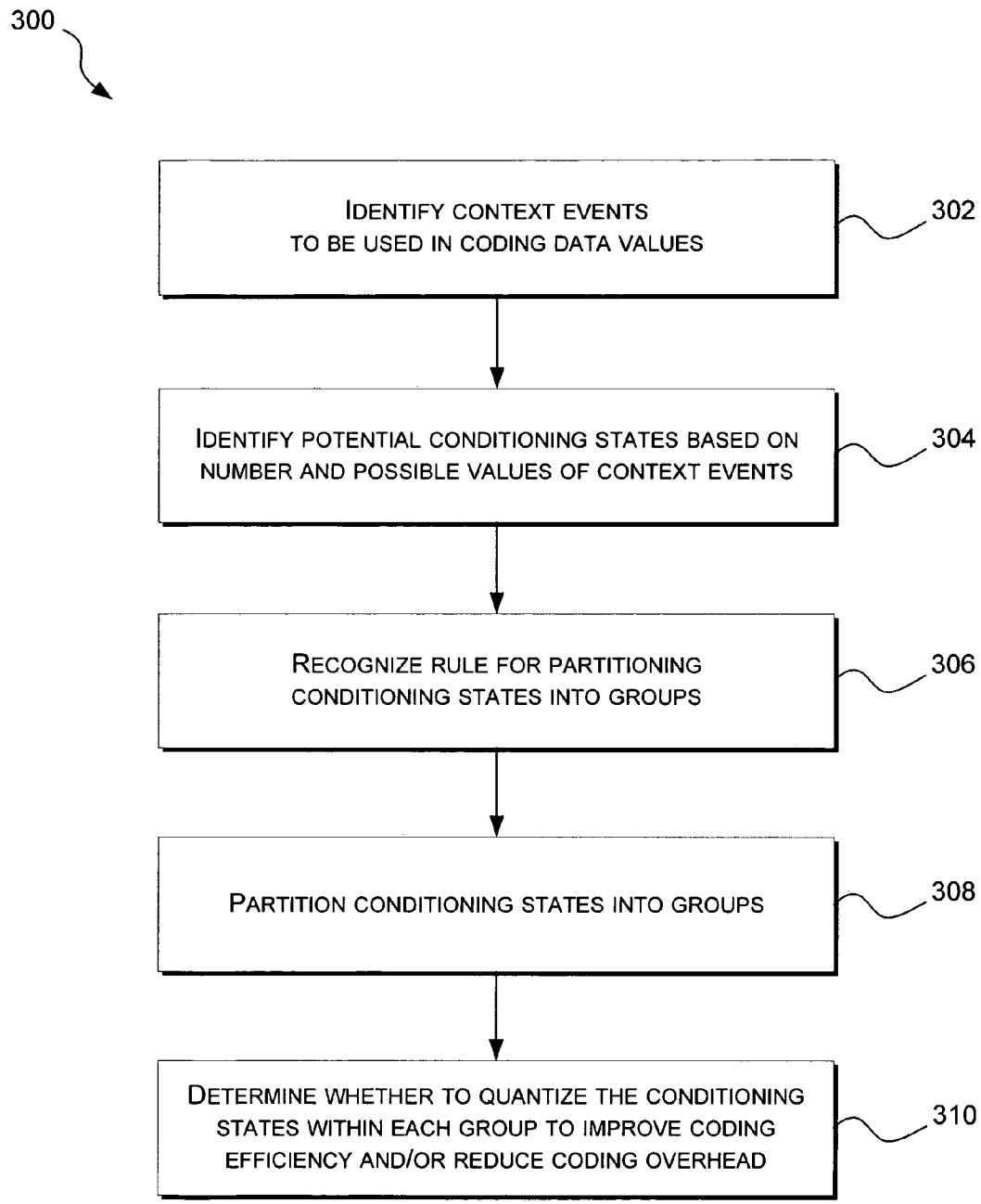
FIG. 3 is a flow diagram of a mode of partitioning conditioning states into groups to facilitate reducing a number of conditioning states.

As part of one process for quantizing conditioning states, FIG. 3 is a flow diagram of a process 300 used to partition conditioning states into groups. At 302, a number of context events to be used in coding data values is identified. At 304, potential conditioning states resulting from the number of the context events and their possible values are identified. At 306, a rule for partitioning into groups the potential conditioning states identified at 304 is recognized. At 308, the conditioning states are partitioned into groups according to the rule recognized at 306. At 310, it is determined whether the conditioning states within each group should be quantized, and to what extent, to improve coding efficiency and/or reduce coding overhead.

The process 300 of partitioning conditioning states is explained in more detail with regard to an example illustrated in FIGS. 4 through 8. A process for reducing the number of partitioned conditioning states is described below with regard to FIGS. 9 through 12.

Example of Partitioning Conditioning States into Groups

Figure 4:
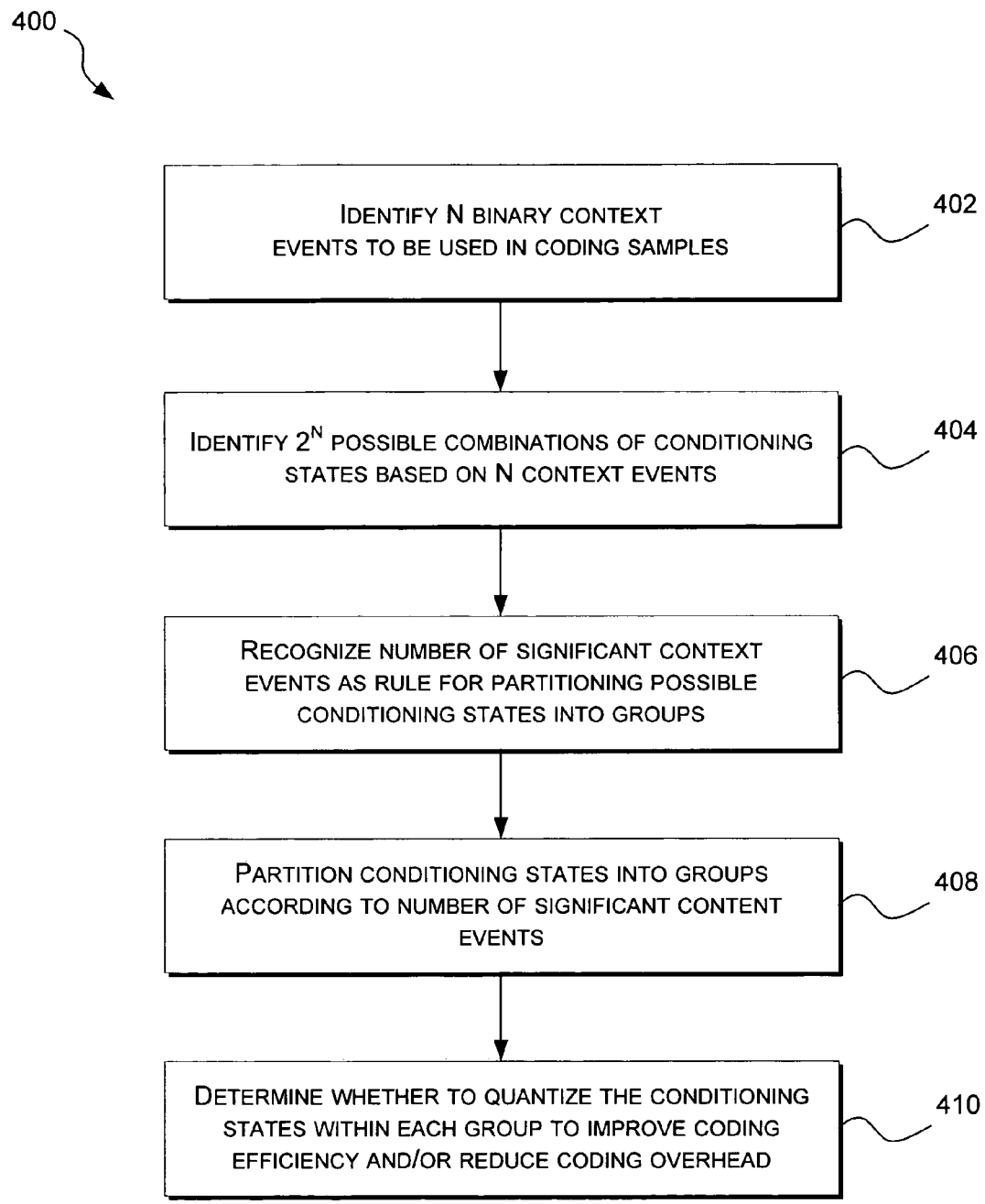
FIG. 4 is a flow diagram of a mode of partitioning conditioning states based on a number of binary context events.

FIG. 4 is a flow diagram illustrating a process 400 for reducing a number of conditioning states derived from a plurality of binary context events. At 402, a number of context events to be used in coding values in the data file, N, are identified. The binary values, for example, may be taken from one or more bit planes representing a value, as is described below with regard to FIG. 8.

For example, as illustrated in FIG. 5, a set of three context events is selected for coding a value of c 500. For this example, the context events all include values in the same bit plane 502 as c 500. A first selected context event includes $c_1$ 504, a value preceding c 500 by one row and one column. A second selected context event includes $c_2$ 506, a value preceding c 500 by one row in the same column. A third selected context event includes $c_3$ 508, a value preceding c 500 by one column in the same row. This set of context events is selected as an example, and modes of context quantization may be used with any number and pattern of context events. Because three context events have been selected for coding the value c 500, then the value of N is equal 3.

At 404, because the context events are binary events, the $2^N$ potential combinations of conditioning states derived from the selected context events are identified. Because N=3, the number of potential combinations of conditioning states is $2^N = 2^3 = 8$. The eight combinations, included in FIG. 6 in a list 600 of potential conditioning states, include 000, 001, 010, 100, 011, 101, 110, and 111.

At 406, in recognizing a rule for partitioning the conditioning states into groups, the rule selected for one mode of context quantization is to partition the groups according to the number of significant context events in each conditioning set. In other words, for example, for N context events $c_i$, including $c_1, c_2 \ldots c_N$, the rule for partitioning the potential conditioning states is to satisfy the condition given in Eq. (1):

$$\sum_{j=0}^{N} c_j = i \quad (1)$$

Eq. (1) thus partitions conditioning states according to the sum of significant, nonzero context events.

Thus, in the three-context event case where N=3, Eq. (1) is solved for i is equal to 0, 1, 2, and 3. Summing the context events for i=0, only one conditioning state, 000, satisfies the condition of Eq. (1) and fits within set 602 for which the sum of the significant context events or digits is equal to 0. For the condition of Eq. (1) where i=1, three conditioning states, 001, 010, and 100, fit within set 604 for which the sum of the significant context events is equal to 1. For the condition of Eq. (1) where i=2, three other conditioning states, 011, 101, and 110, fit within set 606 for which the sum of the significant context events is equal to 2. Finally, for the condition of Eq. (1) where i=3, only one conditioning state, 111, fits within set 608 for which the sum of the significant context events is equal to 3.

At 408, the conditioning states are partitioned into groups according to the significant number of context events. For illustration, FIG. 7 shows the conditioning states in the list of potential conditioning states 600 (FIG. 6) are partitioned into groups. A set of groups 700 partitions the conditioning states according to the condition of Eq. (1) as shown in FIG. 6. In Group 0 702, there is one conditioning state 000. In Group 1 704, there are three conditioning states 001, 010, and 100. In Group 2 706, there also are three conditioning states, 011, 101, and 110. Finally, in Group 3 708, there is one conditioning state, 111. Thus, according to a mode of the context quantizer, $2^N$ or, in this case, $2^3$ or 8 conditioning states have been collected in N+1 or, in this case, 3+1=4 groups.

At 410, it is determined whether the conditioning states should be quantized, and to what extent, to improve coding efficiency and/or reduce coding overhead. A mode of quantizing conditioning states partitioned into groups is described in the next section.

Partitioning the conditioning states into groups simplifies the decision of whether to quantize conditioning states by reducing the number of conditioning states to be analyzed at one time to a manageable quantity. In the example of FIGS. 5, 6, and 7, the number of conditioning states to be evaluated at one time was reduced from 8 to a maximum of 3. Because within the groups 702-708 no more than three conditioning states will be evaluated at one time, computation of whether a particular quantization of conditioning states achieves a desired level of coding efficiency is simplified.

Figure 8:
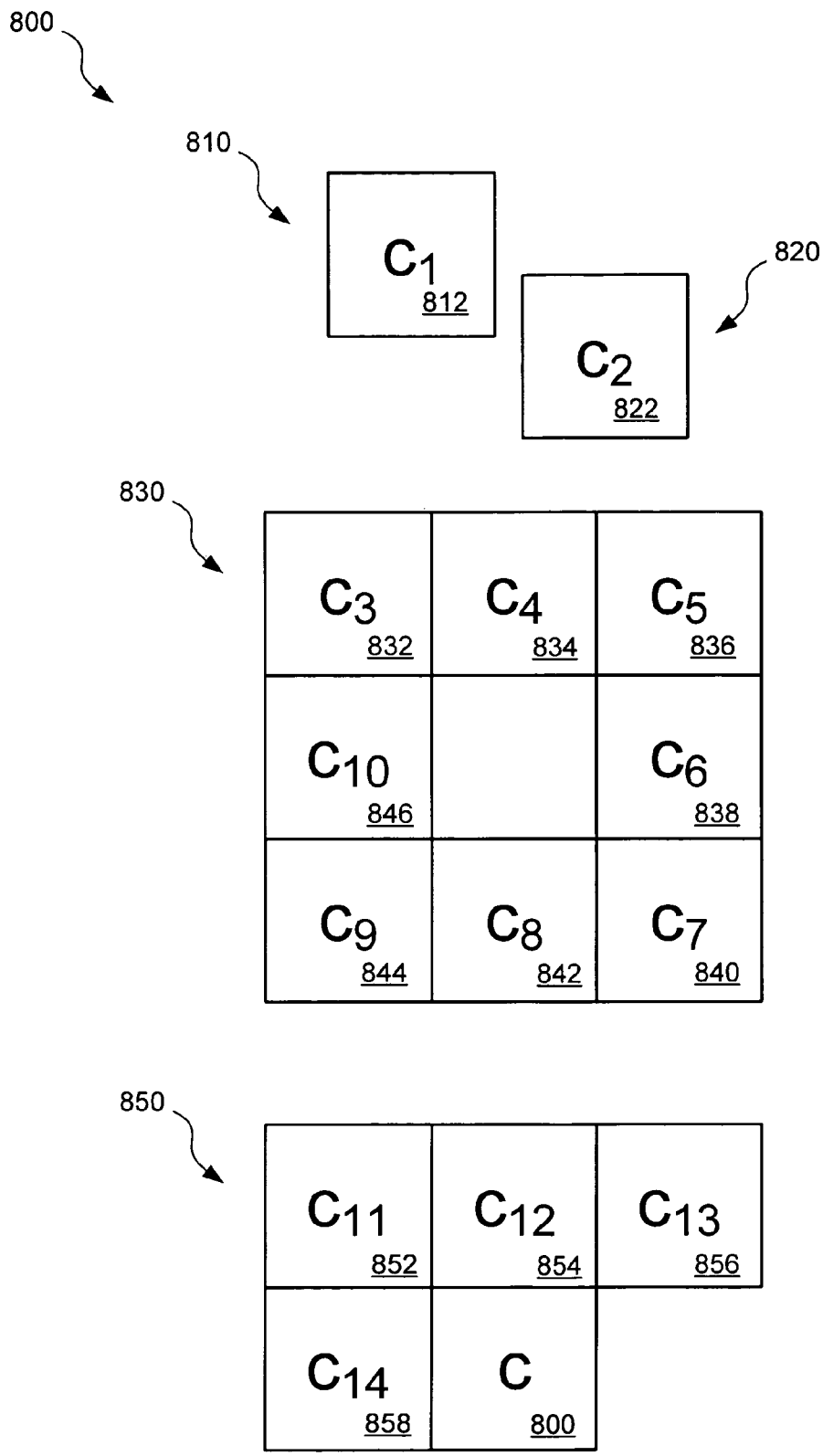
FIG. 8 is a block diagram of fourteen binary context events selected for encoding a data value c.

As the number of context events used in coding a data value is increased, partitioning the conditioning states into groups becomes even more advantageous. FIG. 8, for example, illustrates a set of context events 800 using 14 different context events for coding a value c 800. The 14 context events are used to code scalable image data that has been divided into different access levels according to resolution as resulting from discrete wavelet coding and used in scalable codestreams, as well as into multiple bit planes. More specifically, from a next most significant bit plane at a next lower resolution 810, context event $c_1$ 812 is the value of the corresponding point. From a same plane at the next lower resolution 820, context event $c_3$ 822 is the value of the corresponding point. From the next most significant bit plane at a same resolution 830, context events $c_3$ 832, $c_4$ 834, $c_5$ 836, $c_6$ 838, $c_7$ 840, $c_8$ 842, $c_9$ 844, and $c_{10}$ 846 are values of neighboring points.

Finally, from the same bit plane at the same resolution 850, context events $c_{11}$ 852, $c_{12}$ 854, $c_{13}$ 856, and $c_{14}$ 858 are values of neighboring points.

Using the set of context events illustrated in FIG. 8 may present an efficient set of potential conditioning states. Unfortunately, using fourteen context events results in a potentially impractical set of potential conditioning states for quantization evaluation. Because there are $2^N$ potential conditioning states, and N=14 for 14 context events, the number of potential conditioning states is $2^{14}$ or 16,384 conditioning states that would have to be evaluated. Evaluating 16,384 conditioning states at once clearly is a computation burden.

However, according to a mode of context quantization, the $2^{14}$ conditioning states are partitioned into N+1 groups, which in this case would be 14+1 or 15 groups. Within each of these groups of conditioning states, there is a smaller, more manageable number of states, facilitating evaluation of whether the conditioning states in each group should be quantized.

Quantization of Conditioning States by Layers

For a group of conditioning states, such as those groups resulting from partitioning as described in the foregoing section, the number of conditioning states may be reduced by what is termed layer-based quantization. In sum, all of the conditioning states in a group are regarded as being arranged in a layer. Conditioning states in the layer may be quantized to a parent node of which the quantized conditioning states are child nodes. On each successive level, pairs of conditioning states may be further quantized until all the conditioning states are quantized, layer by layer, to a single conditioning state. If appropriate for the desired coding efficiency, the remaining single conditioning states for a number of groups may be further quantized.

Figure 9:
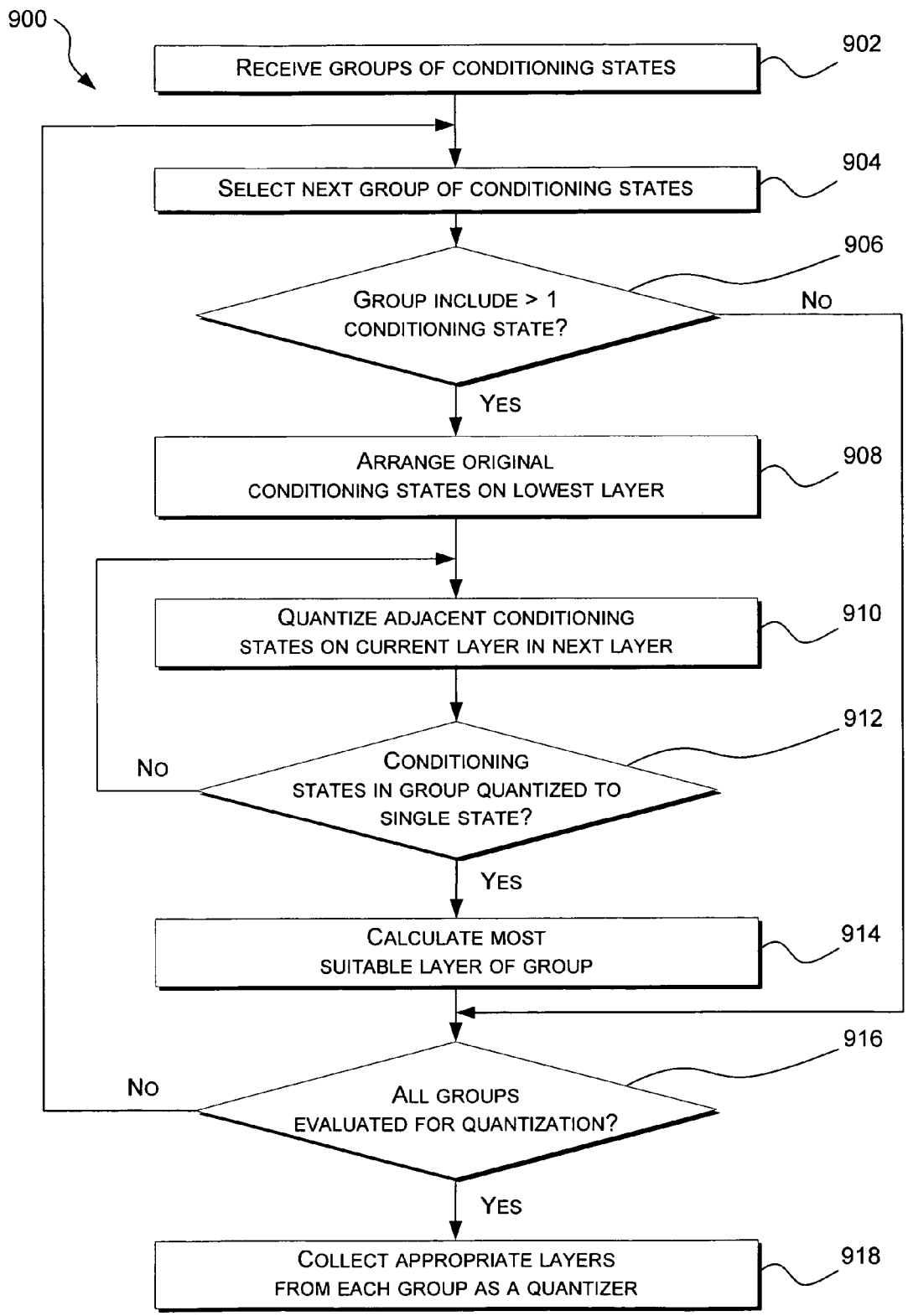
FIG. 9 is a flow diagram of a mode of quantizing conditioning states within a group to reach a desired coding efficiency.

FIG. 9 shows a process 900 by which conditioning states in groups may be quantized in a layer-based approach. At 902, groups of conditioning states, such as the groups yielded by partitioning as described in the foregoing section, are received. At 904, a next group of conditioning states is selected. As previously described, reducing the number of conditioning states to one group simplifies the computational process of identifying appropriate quantization of the conditioning states in each group.

At 906, it is determined if the group includes more than one conditioning state. If not, as in the case of Group 0 702 (FIG. 7) and Group 3 708, there is no quantization possible within the group, and the single conditioning state represents the group. If a group is represented by a single conditioning state, because there is only conditioning state in the group or because multiple conditioning states in a group are quantized to a single conditioning state as described below, these group-level conditioning states may be further quantized using a process such as that being described. However, for purposes of determining quantization within the groups, if the group does not include more than one conditioning state, the process 900 advances to 916 determine if all the groups have been evaluated for quantization. If not, the process 900 loops to 904 to select the next group of conditioning states. On the other hand, if it is determined at 916 that all the groups have been evaluated, at 918, the appropriate layers identified from each group are collected as a context model.

Figure 10:
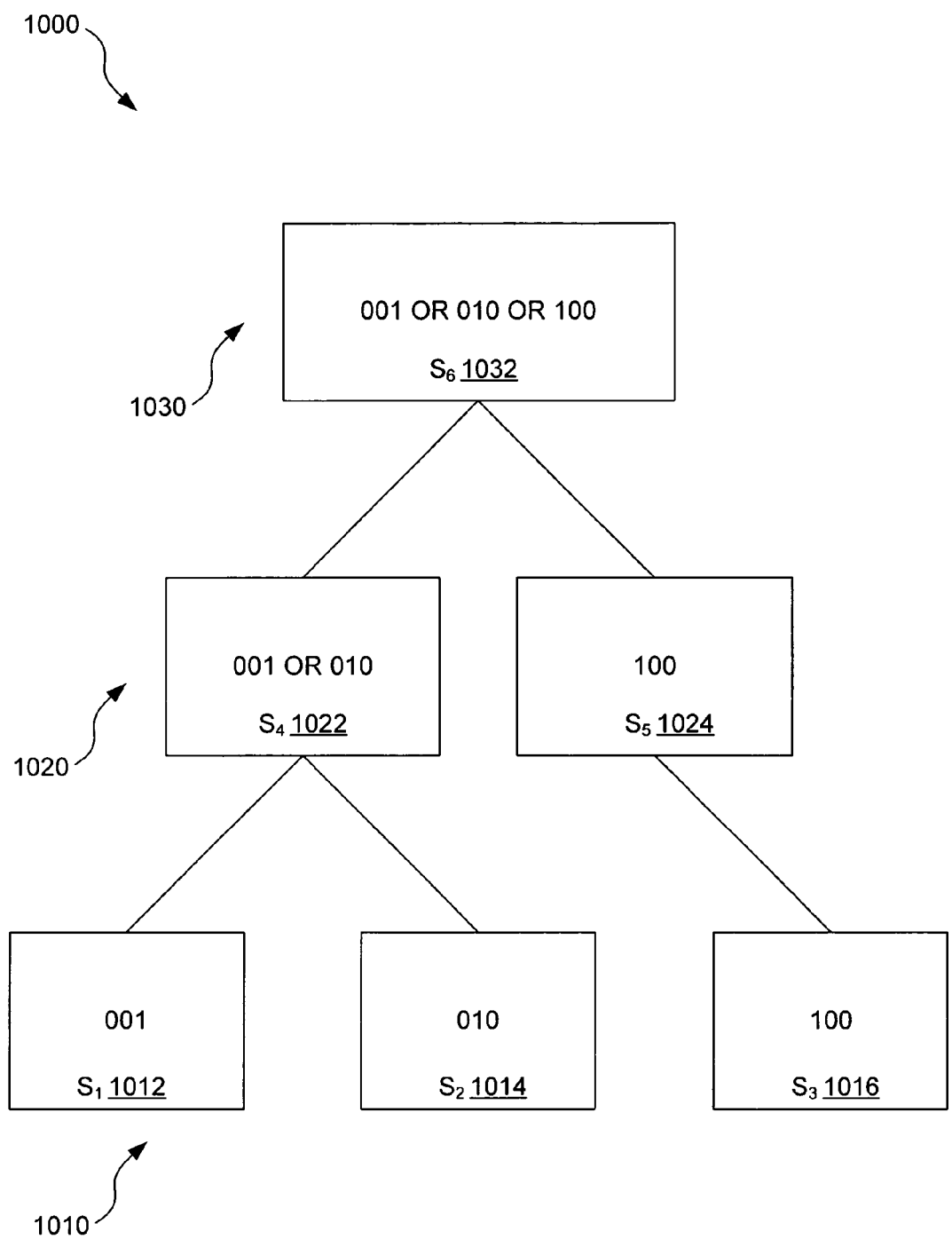
FIG. 10 is a block diagram of a tree representing quantization of conditioning states for a three-event context.

At 908, the original conditioning states are arranged on a first or lowest layer. For example, FIG. 10 shows a series of conditioning states being quantized according to a process illustrated in FIG. 9. On a first layer 1010 the conditioning states from Group 1 704 (FIG. 7), 001, which is designated as $S_1$ 1012, 010, designated as $S_2$ 1014, and 100, designated as $S_3$ 1016, are arranged.

At 910, conditioning states on the current layer are quantized in a next layer. Again, as exemplified in FIG. 10, in a second layer 1020, conditioning states $S_1$ 1012 and $S_2$ 1014 are quantized to a lower order conditioning state $S_4$ 1022, logically combining states $S_1$ 1012 and $S_2$ 1014. Because conditioning state $S_3$ 1016 is not paired with another state, $S_4$ itself is made a conditioning state $S_5$ 1024 on the second layer 1020.

At 912, it is determined if the conditioning states in the group have been quantized to a single state. If not, the process 900 loops to 910 to quantize the conditioning states on the current layer to a next layer. For example, as shown in FIG. 10, the conditioning states $S_4$ 1022 and $S_5$ 1024 on the second layer 1020 would be further quantized to $S_6$ 1032 on a third layer 1030.

However, if it is determined at 912 that the conditioning states in the group have been quantized to a single conditioning state, at 914, it is determined which of the layers is appropriate for use in coding the source, as described below.

At 916, it is determined if all the groups have been evaluated for possible quantization. If not, the process loops to 904 to select the next group of conditioning states. However, if all the groups have been evaluated, at 918, the appropriate layers identified for each of the groups are collected as a quantizer. As will be further described below, as different thresholds or criteria are set for a desirable quantizer, the process may be repeated.

It should be noted that not all possible layers may be formed. Some number or portion of layers may be formed, then it may be determined if any of these layers is suitable or optimal for coding the source. If not, then additional layers may be formed and then evaluated to determine if any of the layers is suitable. In addition, it should be appreciated that all of the layers of all of the groups may be formed, before layers of any of the groups are evaluated to determine which is a suitable or most suitable layer for use in coding the source, as is further described below.

Figure 11:
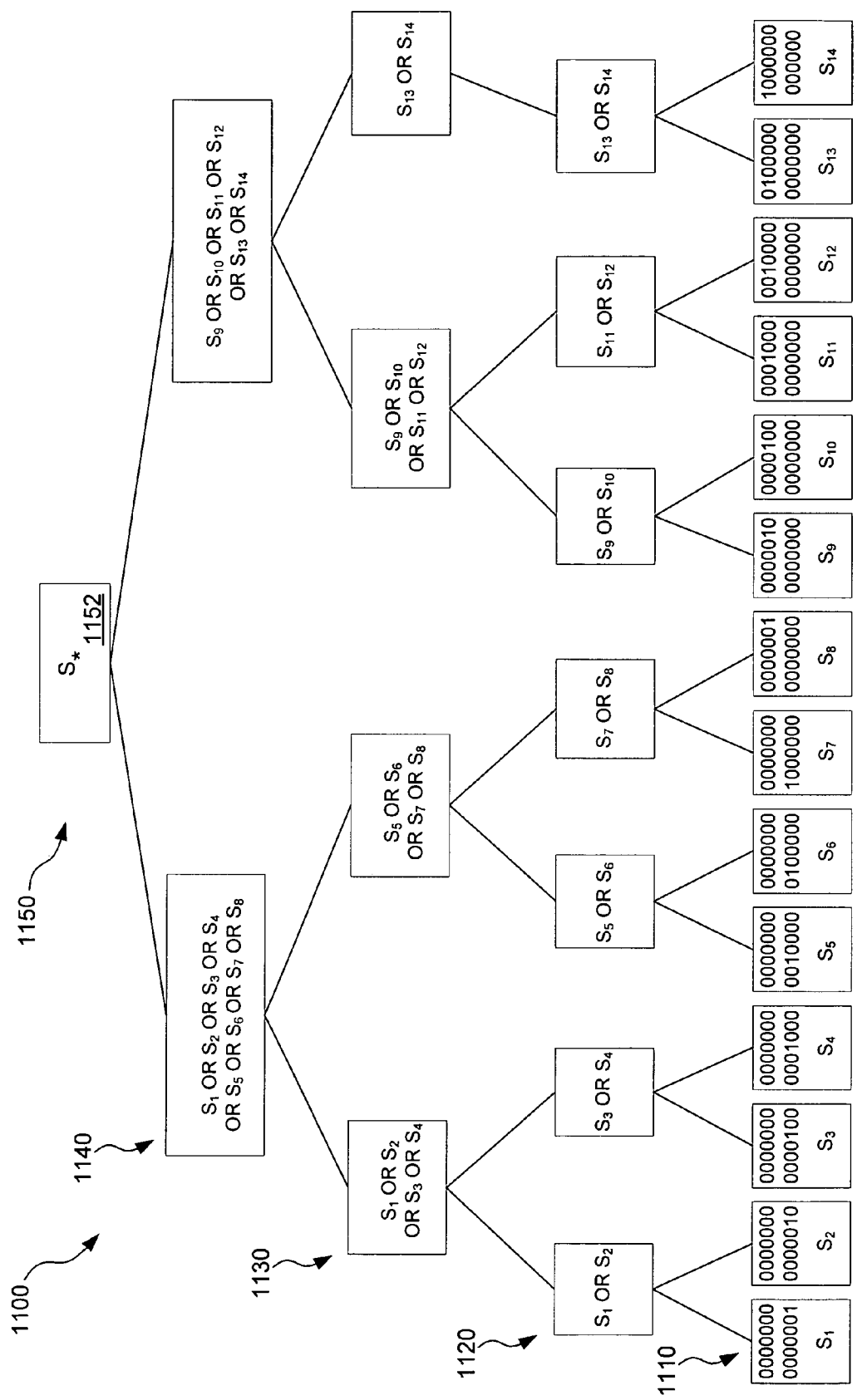
FIG. 11 is a block diagram of a tree representing quantization of conditioning states for a fourteen-event context.

Advantages of partitioning conditioning states into groups and quantizing them as described in connection with FIGS. 4 and 9, respectively, become more clear when using a larger number of context events. Again, referring to the example of using 14 context events, the reduction in the number of conditioning states is even more significant. FIG. 11 shows a series of layers 1100 for 14-context event conditioning states for which there is one significant context event, such as a group that might be generated by partitioning conditioning states using a process like that shown in FIG. 4.

As shown in FIG. 11, for a group where there is one significant context event, a set of 14-context events yield 14 combinations of possible conditioning states. Thus, following a process like that shown in FIG. 9, a first layer 1110 includes 14 conditioning states, a second layer 1120 includes seven conditioning states, a third layer 1130 includes four conditioning states, a fourth layer 1140 includes two conditioning states, and, finally, a single conditioning state, S·X̶ 1152, is reached on a fifth and top-most layer. A suitable layer among the series of layers 1100 may be identified for this group. Similarly, for the other groups derived from 14 context events, most of which would result in more than fourteen conditioning states on a first layer and more than five layers, the appropriate layer may be identified, independently of that of the other groups to develop a desirable context model.

When the context model is selected, it is used to code the source, and it is stored and/or transmitted with the compressed data. The context model is used by an entropy decoder to decode the file, as is understood in the art.

Identification of Appropriate Layers within Groups

Using partitioning and quantization of conditioning states as previously described, a suitable layer within each group to use in a context model is determined by coding efficiency indicators reflecting the relative efficiency to be gained by using one of the layers as compared to other layers. In one embodiment, the coding efficiency indicators are context quantization efficiencies of each layer, and a suitable layer is selected by comparing the context quantization efficiencies of each of the layers relative to a desired context quantization efficiency.

Figure 12:
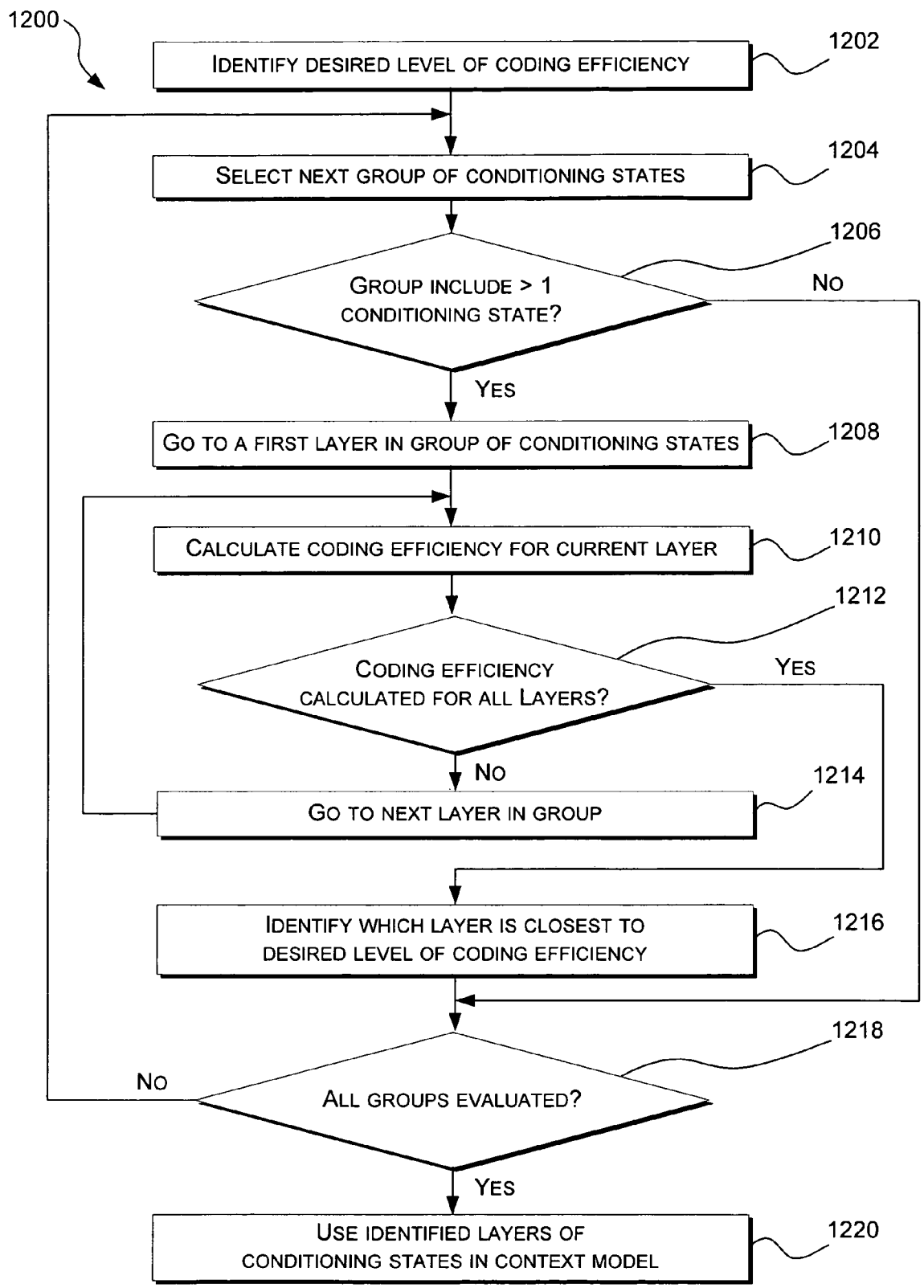
FIG. 12 is a flow diagram of a mode of selecting a layer based on its coding efficiency.

More specifically, FIG. 12 shows a process 1200 for determining which of a plurality of layers, such as the layers in a particular group of conditioning states, should be selected to achieve a desired level of coding efficiency. At 1202, a desired level of coding efficiency, such as a desired context quantization efficiency, is identified. Identification of the desired level may be predicated on available storage or bandwidth for storing and sending the compressed data, respectively. Identification of the desired coding efficiency also may be based on the processing resources available for compressing the source data, and other factors.

At 1204, a next group of conditioning states to be evaluated is selected. At 1206, it is determined if the group includes more than one conditioning state. If there is only one conditioning state, there is no evaluation to be made unless single representative conditioning states for multiple groups are to be quantized as previously described. In the exemplary mode of FIG. 12, if it is determined at 1206 that there is only one conditioning state in the group, the process 1200 advances to 1218 to determine if all the groups have been evaluated. If not, the process 1200 loops to 1204 to select the next group of conditioning states for evaluation. On the other hand, if it is determined at 1218 that all the groups have been evaluated, the identified layers of conditioning states are used in the context model.

In analyzing layers within a selected group having multiple conditioning states, at 1208, a first layer in a group of conditioning states is selected. The first layer may be the lowest layer including all the potential conditioning states, or a topmost, group-level conditioning state to which all other conditioning states have been quantized as previously described. In the embodiment described, the first layer is a lowest layer including all the potential conditioning states. Alternatively, as previously discussed but not shown in FIG. 12, layers may be evaluated for comparison to a desired level of coding efficiency as the layers are being collected as described below, instead of evaluating all the possible layers that may be formed at one time.

At 1210, the coding efficiency for the current layer is determined. In one mode, determining the coding efficiency for a layer is a relative calculation based on comparing the entropy using the conditioning states in the current level relative to the entropy using the conditioning states on a next level, relative to the number of conditioning states in each layer. For example, the current the coding efficiency for a layer j in a group i, $\lambda_i(j)$, can be calculated using Eq. (2):

$$\lambda_i(j) = \frac{H(x|L_i(j)) - H(x|L_i(j+1))}{N(L_i(j+1)) - N(L_i(j))} \qquad (2)$$

In Eq. (2), $H(x|L_i(j))$ represents the entropy for the conditioning states in the current layer $L_i(j)$, and $H(x|L_i(j+1))$ represents the entropy for the conditioning states in the next layer $L_i(j+1)$. $N(L_i(j))$ represents the number of conditioning states in the layer $L_i(j)$, and $N(L_i(j+1))$ represents the number of conditioning states in the layer $L_i(j+1)$. Thus, Eq. (2) determines the relative coding efficiency for each layer relative to the coding efficiency number of conditioning states in each layer.

At 1212, it is determined if the coding efficiency has been determined for each of the layers. If not, at 1214, the process 1200 proceeds to the next layer in the group and the process loops to 1210 to calculate the relative coding efficiency for that layer. On the other hand, if it is determined at 1212 that the relative coding efficiency for each the layers in a group has been determined, the process advances to 1216.

At 1216, it is determined which of the layers is closest to presenting the desired level of coding efficiency. Thus, in one mode, for a desired coding efficiency $\lambda$, the most suitable layer among the layers to be used satisfies the condition of Eq. (3):

$$\lambda_i(k) \leq \lambda \leq \lambda_i(k-1) \quad (3)$$

Thus, the relative coding efficiency for each layer k, $\lambda_i(k)$, and the next lowest layer k−1, $\lambda_i(k-1)$, is compared to the desired coding efficiency $\lambda$. Thus, the most suitable layer is represented by that layer having a relative coding efficiency that is equal to or less than the desired coding efficiency $\lambda$, when the coding efficiency of the next lowest layer is greater than or equal to the desired coding efficiency and, thus, perhaps, higher than optimal.

In the alternative, instead of calculating the relative context quantization efficiency of each layer using Eqs. (2) and (3), for a given total number of quantized states to be included in a context model, the most suitable layer of each group may be determined using a Lagrangian minimization problem. Some fast searching algorithms, such as bisection, may be used to reduce the search complexity.

At 1218, it is determined if all the groups have been evaluated. If not, the process 1200 loops to 1204 to select the next group of conditioning states to begin the process of identifying a suitable layer within that group. On the other hand, if it is determined at 1218 that all the groups have been evaluated, at 1220, the identified layers of conditioning states within each group are collected to be used as the context model.

Computing System for Implementing Exemplary Embodiments

Figure 13:
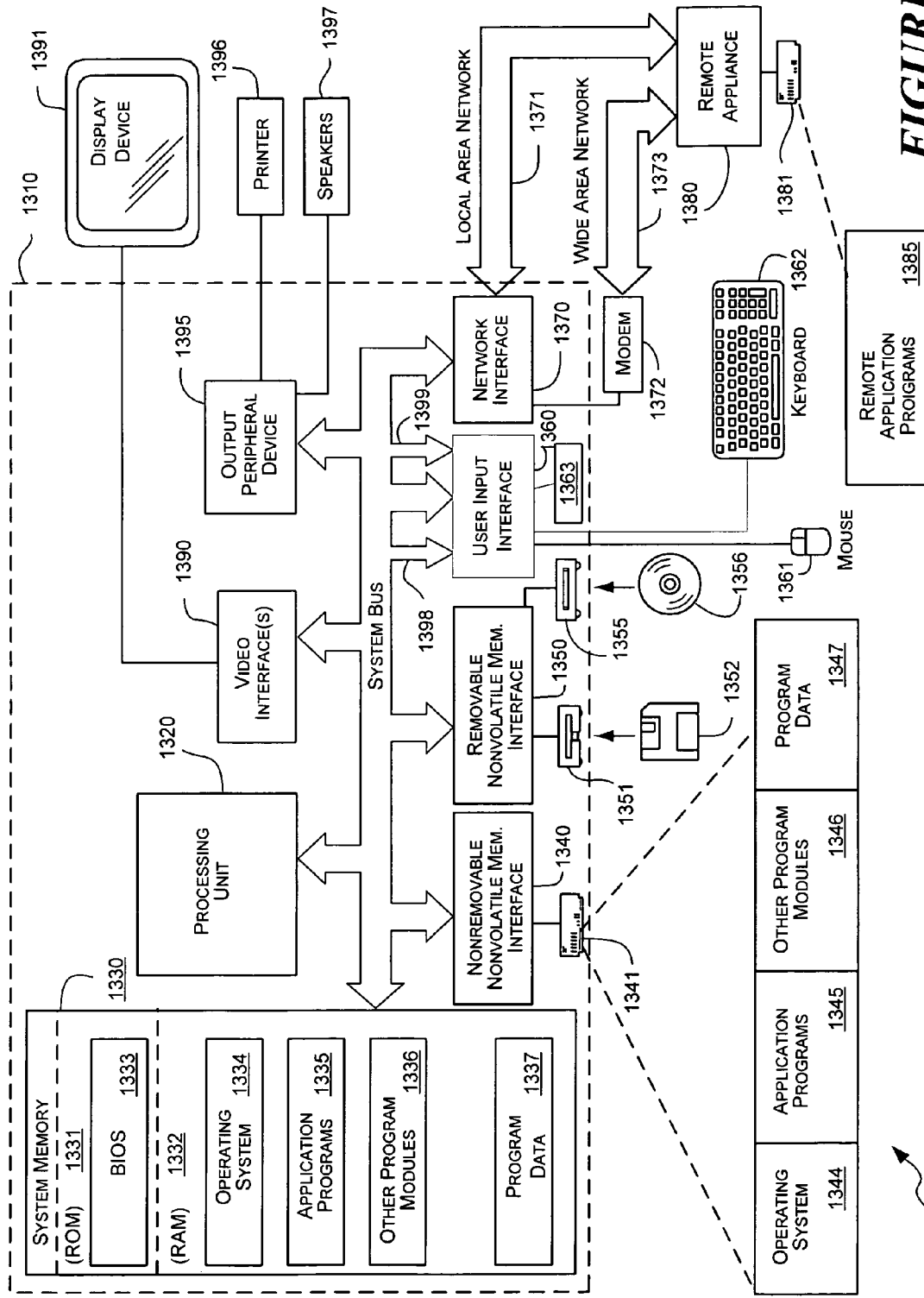
FIG. 13 is a block diagram of a computing-system environment suitable for performing encoding or decoding using context partitioning or layer-based quantization.

FIG. 13 illustrates an exemplary computing system 1300 for implementing embodiments of conditioning state partitioning and/or layer-based quantization. The computing system 1300 is only one example of a suitable operating environment and is not intended to suggest any limitation as to the scope of use or functionality of exemplary embodiments of conditioning state partitioning and/or layer-based quantization previously described, or other embodiments. Neither should the computing system 1300 be interpreted as having any dependency or requirement relating to any one or combination of components illustrated in the exemplary computing system 1300.

The conditioning state partitioning and/or layer-based quantization processes may be described in the general context of computer-executable instructions, such as program modules, being executed on computing system 1300. Generally, program modules include routines, programs, objects, components, data structures, etc., that perform particular tasks or implement particular abstract data types. Moreover, those skilled in the art will appreciate that the conditioning state partitioning and/or layer-based quantization processes may be practiced with a variety of computer-system configurations, including hand-held devices, multiprocessor systems, microprocessor-based or programmable-consumer electronics, minicomputers, mainframe computers, and the like. The conditioning state partitioning and/or layer-based quantization processes may also be practiced in distributed-computing environments where tasks are performed by remote-processing devices that are linked through a communications network. In a distributed-computing environment, program modules may be located in both local and remote computer-storage media including memory-storage devices.

With reference to FIG. 13, an exemplary computing system 1300 for implementing the conditioning state partitioning and/or layer-based quantization processes includes a computer 1310 including a processing unit 1320, a system memory 1330, and a system bus 1321 that couples various system components including the system memory 1330 to the processing unit 1320.

The computer 1310 typically includes a variety of computer-readable media. By way of example, and not limitation, computer-readable media may comprise computer-storage media and communication media. Examples of computer-storage media include, but are not limited to, Random Access Memory (RAM); Read Only Memory (ROM); Electronically Erasable Programmable Read Only Memory (EEPROM); flash memory or other memory technology; CD ROM, digital versatile discs (DVD) or other optical or holographic disc storage; magnetic cassettes, magnetic tape, magnetic disk storage or other magnetic storage devices; or any other medium that can be used to store desired information and be accessed by computer 1310. The system memory 1330 includes computer-storage media in the form of volatile and/or nonvolatile memory such as ROM 1331 and RAM 1332. A Basic Input/Output System 1333 (BIOS), containing the basic routines that help to transfer information between elements within computer 1310 (such as during start-up) is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336, and program data 1337.

The computer 1310 may also include other removable/nonremovable, volatile/nonvolatile computer-storage media. By way of example only, FIG. 13 illustrates a hard disk drive 1341 that reads from or writes to nonremovable, nonvolatile magnetic media, a magnetic disk drive 1351 that reads from or writes to a removable, nonvolatile magnetic disk 1352, and an optical-disc drive 1355 that reads from or writes to a removable, nonvolatile optical disc 1356 such as a CD-ROM or other optical media. Other removable/nonremovable, volatile/nonvolatile computer-storage media that can be used in the exemplary operating environment include, but are not limited to, magnetic tape cassettes, flash memory units, digital versatile discs, digital video tape, solid state RAM, solid state ROM, and the like. The hard disk drive 1341 is typically connected to the system bus 1321 through a nonremovable memory interface such as interface 1340. Magnetic disk drive 1351 and optical disc drive 1355 are typically connected to the system bus 1321 by a removable memory interface, such as interface 1350.

The drives and their associated computer-storage media discussed above and illustrated in FIG. 13 provide storage of computer-readable instructions, data structures, program modules and other data for computer 1310. For example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337. Typically, the operating system, application programs, and the like that are stored in RAM are portions of the corresponding systems, programs, or data read from hard disk drive 1341, the portions varying in size and scope depending on the functions desired. Operating system 1344, application programs 1345, other program modules 1346, and program data 1347 are given different numbers here to illustrate that, at a minimum, they can be different copies. A user may enter commands and information into the computer 1310 through input devices such as a keyboard 1362; pointing device 1361, commonly referred to as a mouse, trackball or touch pad; a wireless-input-reception component 1363; or a wireless source such as a remote control. Other input devices (not shown) may include a microphone, joystick, game pad, satellite dish, scanner, or the like. These and other input devices are often connected to the processing unit 1320 through a user-input interface 1360 that is coupled to the system bus 1321 but may be connected by other interface and bus structures, such as a parallel port, game port, IEEE 1394 port, or a universal serial bus (USB) 1398, or infrared (IR) bus 1399. As previously mentioned, input/output functions can be facilitated in a distributed manner via a communications network.

A display device 1391 is also connected to the system bus 1321 via an interface, such as a video interface 1390. Display device 1391 can be any device to display the output of computer 1310 not limited to a monitor, an LCD screen, a TFT screen, a flat-panel display, a conventional television, or screen projector. In addition to the display device 1391, computers may also include other peripheral output devices such as speakers 1397 and printer 1396, which may be connected through an output peripheral interface 1395.

The computer 1310 will operate in a networked environment using logical connections to one or more remote computers, such as a remote computer 1380. The remote computer 1380 may be a personal computer, and typically includes many or all of the elements described above relative to the computer 1310, although only a memory storage device 1381 has been illustrated in FIG. 13. The logical connections depicted in FIG. 13 include a local-area network (LAN) 1371 and a wide-area network (WAN) 1373 but may also include other networks, such as connections to a metropolitan-area network (MAN), intranet, or the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the network interface 1370, or other appropriate mechanism. Modem 1372 could be a cable modem, DSL modem, or other broadband device. In a networked environment, program modules depicted relative to the computer 1310, or portions thereof, may be stored in the remote memory storage device. By way of example, and not limitation, FIG. 13 illustrates remote application programs 1385 as residing on memory device 1381. It will be appreciated that the network connections shown are exemplary, and other means of establishing a communications link between the computers may be used.

Although many other internal components of the computer 1310 are not shown, those of ordinary skill in the art will appreciate that such components and the interconnections are well-known. For example, including various expansion cards such as television-tuner cards and network-interface cards within a computer 1310 is conventional. Accordingly, additional details concerning the internal construction of the computer 1310 need not be disclosed in describing exemplary embodiments of the conditioning state partitioning and/or layer-based quantization processes.

When the computer 1310 is turned on or reset, the BIOS 1333, which is stored in ROM 1331, instructs the processing unit 1320 to load the operating system, or necessary portion thereof, from the hard disk drive 1341 into the RAM 1332. Once the copied portion of the operating system, designated as operating system 1344, is loaded into RAM 1332, the processing unit 1320 executes the operating system code and causes the visual elements associated with the user interface of the operating system 1334 to be displayed on the display device 1391. Typically, when an application program 1345 is opened by a user, the program code and relevant data are read from the hard disk drive 1341 and the necessary portions are copied into RAM 1332, the copied portion represented herein by reference numeral 1335.

CONCLUSION

Although exemplary embodiments have been described in language specific to structural features and/or methodological acts, it is to be understood that the appended claims are not necessarily limited to the specific features or acts previously described. Rather, the specific features and acts are disclosed as exemplary embodiments.

The invention claimed is;

1. A method for selecting conditioning states to be used in a context model for coding a source, comprising:
    storing in a memory the method for selecting conditioning states to be used in the context model for coding the source;
    processing on a processor the method for selecting conditioning states to be used in the context model for coding the source;
    recognizing a plurality of potential conditioning states;
    partitioning the plurality of potential conditioning states into groups of conditioning states according to a rule, at least one of the groups including a plurality of conditioning states, wherein the potential conditioning states includes one of:
        a plurality of original conditioning states representing possible combinations of context events; and
        a plurality of quantized conditioning states quantized from the potential conditioning states or a plurality of previously quantized conditioning states;
    selecting at least one of the groups of conditioning states to be used in the context model; and
    forming a plurality of layers by:
        collecting the conditioning states in a layer; and
        quantizing at least a portion of the conditioning states in the layer to create a next layer of collective conditioning states, wherein quantizing the conditioning states in the layer to create the next layer includes:
            quantizing each of a plurality of pairs of conditioning states in the layer as a collective conditioning state in the next layer;
            when there is a remaining conditioning state in the layer after each of the pairs of conditioning states have been quantized, including the remaining conditioning state in the next layer; and outputting the selected conditioning states to be used in the context model for coding a source.

2. A method of claim 1 wherein both the source and each of the context events $c_i$ include at least one binary value, such that for N context events, there exist $2^N$ potential conditioning states $c_1 c_2 \ldots C_N$.

3. A method of claim 2, wherein the rule partitions the $2^N$ potential conditioning states into groups having a number of significant context events i, such that the conditioning states partitioned into a group i that satisfy a condition:

$$\sum_{j=0}^{N} c_j = i.$$

4. A method of claim 1, further comprising selecting one of plurality of layers to be used in the context model based on context quantization efficiencies of the layers.

5. A method of claim 4, further comprising:
calculating the context quantization efficiency $\lambda_i(j)$ of each of the layers $L_i(j)$ from the first layer to a top layer $L_i(1)$ within the group i including a single conditioning state where:

$$\lambda_i(j) = \frac{H(x|L_i(j)) - H(x|L_i(j+1))}{N(L_i(j+1)) - N(L_i(j))}$$

where
$H(x|L_i(j))$ includes entropy of a coding of a source using the plurality of the conditioning states in layer $L_i(j)$; and
$N(L_i(j))$ includes a number of the conditioning states in the layer $L_i(j)$.

6. A method of claim 5, further comprising identifying a selected layer $L_i(k)$ among the layers in the group i most closely satisfying an expression:

$$\lambda_i(k) \leq \lambda \leq \lambda_i(k-1)$$

where $\lambda$ includes a desired a context quantization efficiency.

7. A method of claim 6, further comprising:
in groups including more than a single conditioning state, quantizing the conditioning states in each of the groups until the conditioning states in the group are quantized to a single conditioning state; and
quantizing the single conditioning states representing the groups to satisfy a condition based on the desired context quantization efficiency.

8. A method of claim 1, further comprising selecting the conditioning states or the subset of the conditioning states using a Lagrangian minimization problem for a given total number of quantized conditioning states.

9. A computer-storage media having computer-useable instructions embodied thereon for executing the method of claim 1.

10. A method for selecting conditioning states to be used in a context model for coding a source, comprising:
storing in a memory the method for selecting conditioning states to be used in the context model for coding the source;
processing on a processor the method for selecting conditioning states to be used in the context model for coding the source;

collecting the conditioning states in a group on a first layer;
quantizing at least a portion of the conditioning states on the first layer to form a second layer, wherein quantizing the plurality of conditioning states in the previous layer includes:
quantizing each of a plurality of pairs of conditioning states on the first layer as a collective conditioning state in the second layer; and
when there is a remaining conditioning state after each of the pairs of conditioning states have been quantized, including the remaining conditioning state on the second layer;
selecting for use in the context model one of the first layer and the second layer based on coding efficiency indicators of each of the layers; and
outputting the selected conditioning states to be used in the context model for coding a source.

11. A method of claim 10, further comprising forming the group by partitioning a plurality of potential conditioning states into a plurality of groups according to a rule, such that the conditioning states assigned to the group include a subset of the potential conditioning states.

12. A method of claim 10, further comprising:
selecting context quantization efficiencies as the coding efficiency indicators;
calculating a context quantization efficiency $\lambda_i(j)$ of each of the layers in the group i, $L_i(j)$, where:

$$\lambda_i(j) = \frac{H(x|L_i(j)) - H(x|L_i(j+1))}{N(L_i(j+1)) - N(L_i(j))}$$

where:
$H(x|L_i(j))$ includes entropy of a coding of a source using the plurality of the conditioning states in layer $L_i(j)$; and
$N(L_i(j))$ includes a number of the conditioning states in the layer $L_i(j)$.

13. A method of claim 12, further comprising identifying a selected layer $L_i(k)$ among the layers in the group i most closely satisfying an expression:

$$\lambda_i(k) \leq \lambda \leq \lambda_i(k-1)$$

where $\lambda$ includes a desired a context quantization efficiency.

14. A method of claim 10, further selecting for use in the context model one of the first layer and the second layer by using a Lagrangian minimization problem for a given total number of quantized conditioning states.

15. A computer-storage media having computer-useable instructions embodied thereon for executing the method of claim 10.

16. A method for identifying conditioning states to be used in a context model for coding a source, comprising:
storing in a memory the method for identifying conditioning states to be used in the context model for coding the source;
processing on a processor the method for identifying conditioning states to be used in the context model for coding the source;
partitioning a plurality of potential conditioning states into groups;
collecting conditioning states in at least one group into a layer;

quantizing at least a portion of the conditioning states in the layer to create a plurality of subsequent layers of collective conditioning states;

quantizing the collective conditioning states in each of the plurality of subsequent layers until the conditioning states partitioned to the group are quantized to a single conditioning state; and selecting a set of conditioning states from plurality of layers of the collective conditioning states based on coding efficiencies of the layers; and outputting the selected set of conditioning states.

* * * * *